United States Patent [19]

Cycon et al.

[11] Patent Number: 5,058,824
[45] Date of Patent: Oct. 22, 1991

[54] SERVO CONTROL SYSTEM FOR A CO-AXIAL ROTARY WINGED AIRCRAFT

[75] Inventors: James P. Cycon, Orange; George S. Schneider, Hamden; Gregory P. Tenerowicz, Seymour, all of Conn.

[73] Assignee: United Technologies Corporation, Hartford, Conn.

[21] Appl. No.: 454,488

[22] Filed: Dec. 21, 1989

[51] Int. Cl.$^5$ .............................................. B64C 11/34
[52] U.S. Cl. .................... 244/17.13; 244/190; 416/33
[58] Field of Search .................... 244/190, 17.13; 340/825.25, 825.72; 341/176; 318/16; 416/31, 33

[56] References Cited

U.S. PATENT DOCUMENTS

| | | | |
|---|---|---|---|
| 2,810,533 | 10/1957 | Lauderdale et al. | 244/190 |
| 3,141,634 | 7/1964 | Rhoads et al. | 244/14 |
| 3,223,359 | 12/1965 | Quick et al. | 244/17.13 |
| 4,071,811 | 1/1978 | Irwin | 318/16 |
| 4,304,375 | 12/1981 | Builta et al. | 244/17.13 |
| 4,330,829 | 5/1982 | Fischer et al. | 244/17.13 |
| 4,376,979 | 3/1983 | Fowler et al. | 244/17.13 |
| 4,519,743 | 5/1985 | Ham | 244/17.13 |
| 4,628,312 | 12/1986 | Hwang et al. | 340/825.640 |
| 4,668,950 | 5/1987 | Russell, Jr. et al. | 340/825.65 |
| 4,748,446 | 5/1988 | Hayworth | 340/825.640 |

Primary Examiner—Joseph F. Peters, Jr.
Assistant Examiner—Christopher P. Ellis

[57] ABSTRACT

A servo control system for a radio controlled co-axial rotor helicopter includes a receiver 4 to provide signals indicative of operator desired pitch, yaw, roll, and collective commands to an electronic mixer unit 30 which translates these command signals into six control signals 34-42 utilized by servos 50-60 to properly displace the rotor blades 256, 258.

5 Claims, 7 Drawing Sheets

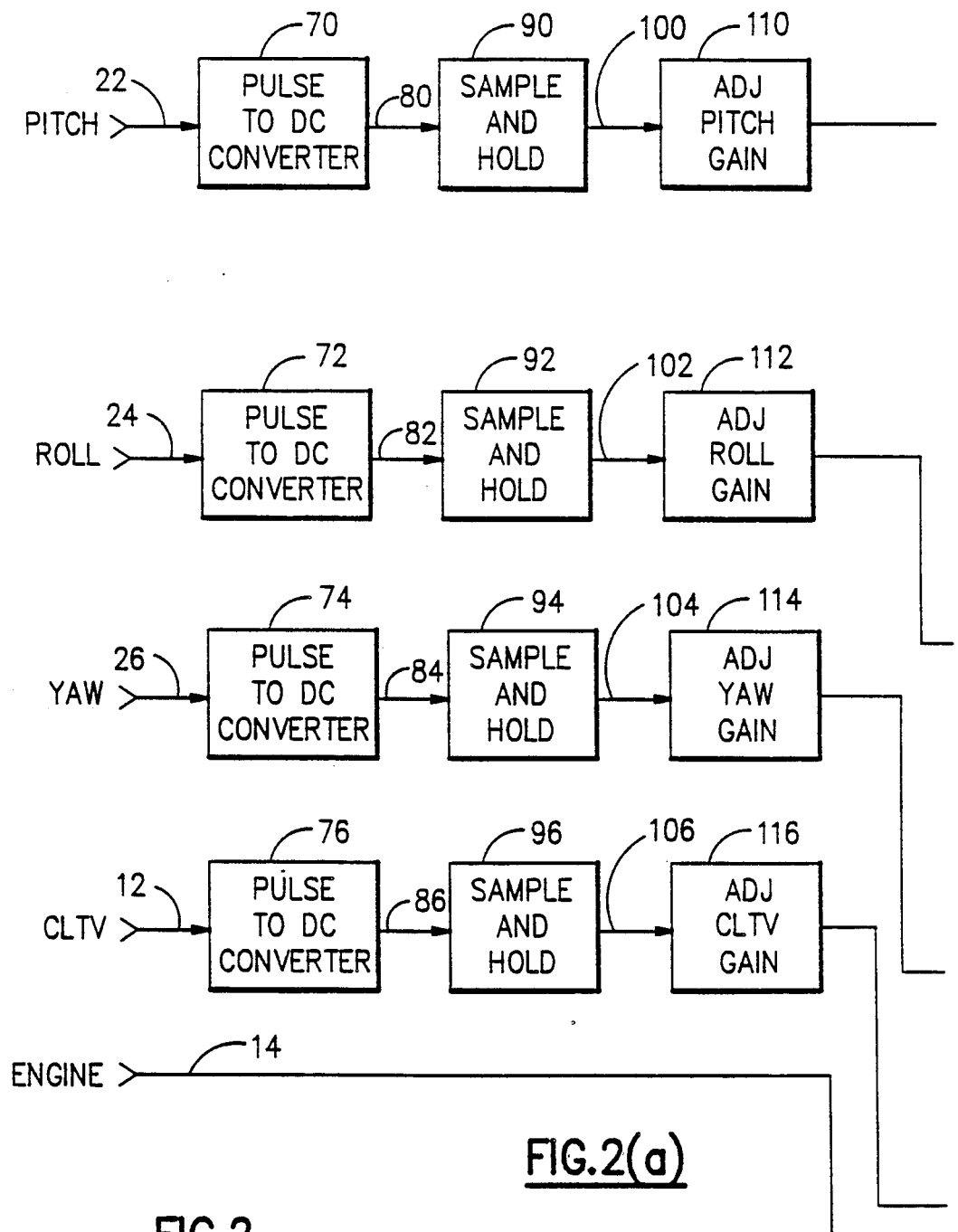
FIG.2(a)
FIG.2
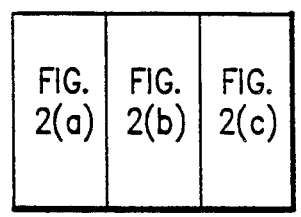

SERVO CONTROL SYSTEM FOR A CO-AXIAL ROTARY WINGED AIRCRAFT

TECHNICAL FIELD

This invention relates to unmanned rotary winged aerial vehicles, and more particularly, a servo control system for a co-axial rotor, unmanned rotary winged aircraft.

BACKGROUND ART

Recent developments in the engineering sciences have made the use of unmanned rotary winged aircraft (URWA) for commercial and military applications achievable, though these vehicles are just a fraction of the size of their manned counterparts. One of the major obstacles to UAV development, consequently, is designing around size and weight restrictions.

There are many different systems developed for counteracting rotor torque in rotary winged aircraft. Counter-rotating or co-axial rotors (counter rotating blades on a common center line) is one such system which has proven to be desirable for URWA application. There are two major advantages to using co-axial rotor systems. One is their relative compactness due to elimination of the tail rotor and the other is improved vehicle maneuverability as a consequence of each rotor being able to have its own collective and cyclic control. A co-axial rotor system may be responsive to six possible control options. These options are: both rotors increasing or decreasing collective pitch (lift control); one rotor increases while the other rotor decreases collective pitch (yaw control); both rotors have the same amount of longitudinal cyclic pitch (pitch control); differential longitudinal cyclic pitch between rotors (center of pressure control); both rotors have the same amount of lateral cyclic pitch (roll control); and differential lateral cyclic pitch between rotors (center of pressure control). Utilizing six control options presents a problem, though, because traditional helicopter flight controllers provide only four operator input parameters (pitch, roll, yaw, and collective). A conversion system to translate operator input into appropriate rotor blade control must, therefore, be provided.

Prior co-axial rotor URWAs utilize conversion systems comprised of mechanical mixing units which incorporate a complex series of linkages to provide push rod control outputs (corresponding to the aforementioned control options) for rotor blade displacement. Unfortunately, these units are large, complex, and heavy. Their complexity is disadvantageous to reliability and serviceability while their size and weight impose severe aircraft operational constraints and also necessitates that they be mounted on the airframe considerable distances from the rotors. Consequently, the aforementioned push rod controls must be long devices, further compounding system size, weight, and complexity problems. In addition to these drawbacks, mechanical systems are not easily adaptable if changes in gain, sensitivity, or phase are required or if additional control inputs or outputs are needed in the course of program development.

DISCLOSURE OF THE INVENTION

An object of the present invention is to provide for an electronic servo control system for a co-axial rotor, rotary winged aircraft.

Another objective is to provide a servo control system for a co-axial rotor, rotary winged aircraft which locates blade controls in close proximity to the rotors.

According to the present invention, electronic signals representative of operator pitch, roll, yaw, and collective commands are converted by an electronic mixing unit into rotor blade control commands that control six rotor blade servos which are located in close proximity to the rotor swashplates.

The present system is smaller, lighter, and simpler in operation than previous systems. It eliminates complex mechanical mixing systems and long push rod blade controllers and therefore improves reliability and serviceability. It is readily adaptable for additional inputs, such as gyros and accelerometers into the control chain. It is also easily adjustable for tuning to individual aircraft and aircraft operator preferences.

These and other objects, features and advantages of the present invention will become more apparent in the light of the detailed description of the exemplary embodiments thereof, as illustrated by the drawing.

BEST MODE FOR CARRYING OUT THE INVENTION

Figure 1:
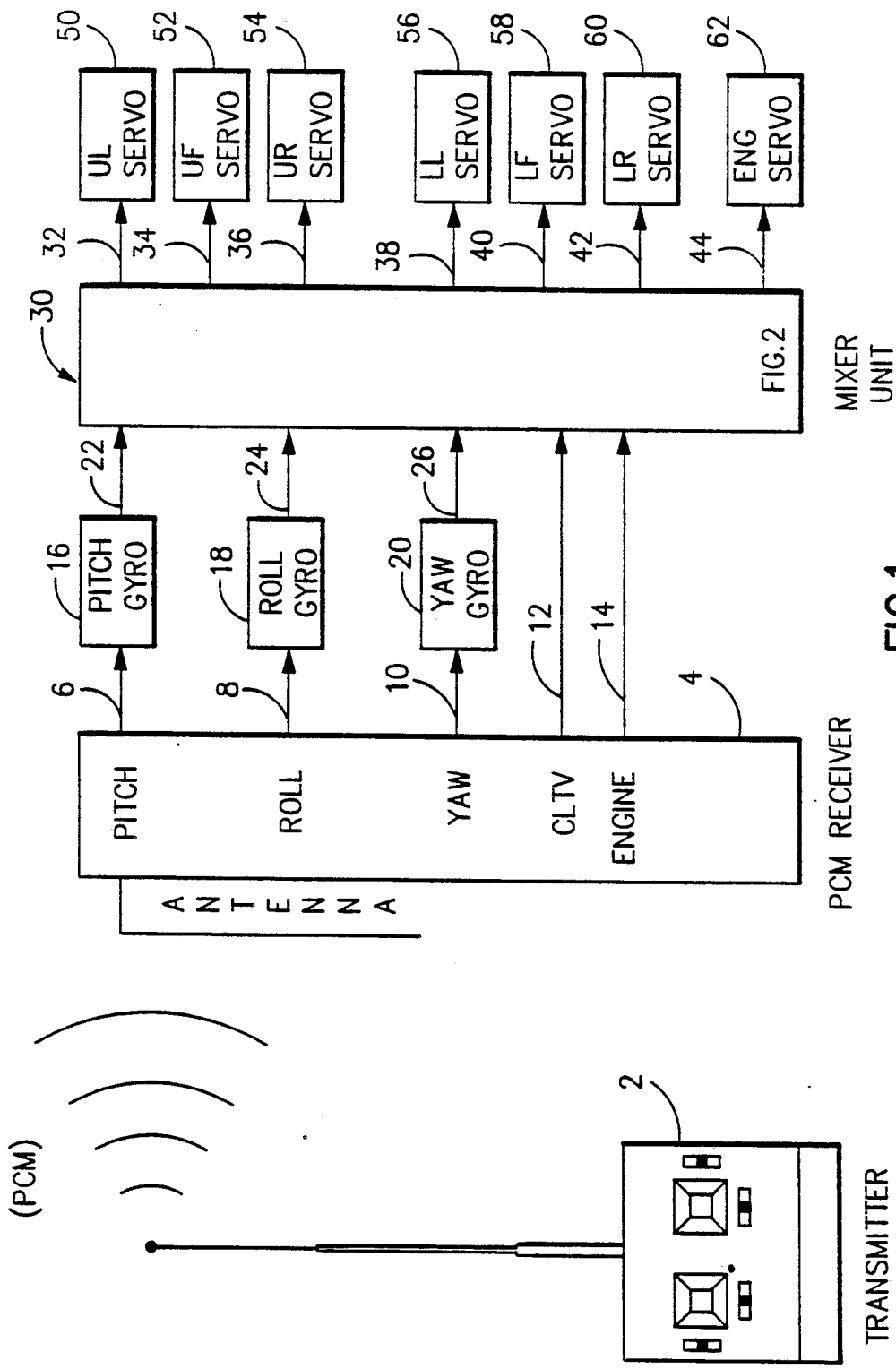
FIG. 1 is a simplified block diagram of the present invention.

Referring now to FIG. 1, a radio control transmitter 2 translates manual input commands for engine throttle and the pitch, roll, yaw, and collective movement of the unmanned, rotary winged aircraft into a serial pulse code modulated (PCM) radio signal which is received by a receiver 4 and translated into parallel pulse width modulated (PWM) signals provided on lines 6–14. The pitch, roll, and yaw signals on lines 6–10 are provided to pitch, roll, and yaw rate gyros 16–20. Each gyro 16–20 senses vehicle motion in its respective axis and corrects the PWM control signal for that axis to ensure vehicle stability.

The transmitter 2, receiver 4, and gyros 16–20 are systems well known in the prior art. Transmitters, receivers and gyros suitable for the control system are manufactured by Futaba and have catalog numbers FP-T8SGHP, FP-R118GP, FP-G152, respectively. Alternatively, the transmitter and receiver may be replaced by an on-board flight control system (not shown) to provide preprogrammed pitch, roll, yaw, and collective command signals.

A mixer unit 30 utilizes the gyro outputs provided on lines 22–26 and the collective control signal provided on line 12 to provide servo control signals on lines 32–42 for six rotor control servos 50–60: left, front and right for the upper rotor (UL, UF, UR) and left, front and right for the lower rotor (LL, LF, LR). The engine throttle control signal on line 14 is provided to the mixer unit 30 for utilization as a timing source and to provide an engine throttle control signal to an engine throttle servo 62.

Figure 2B:
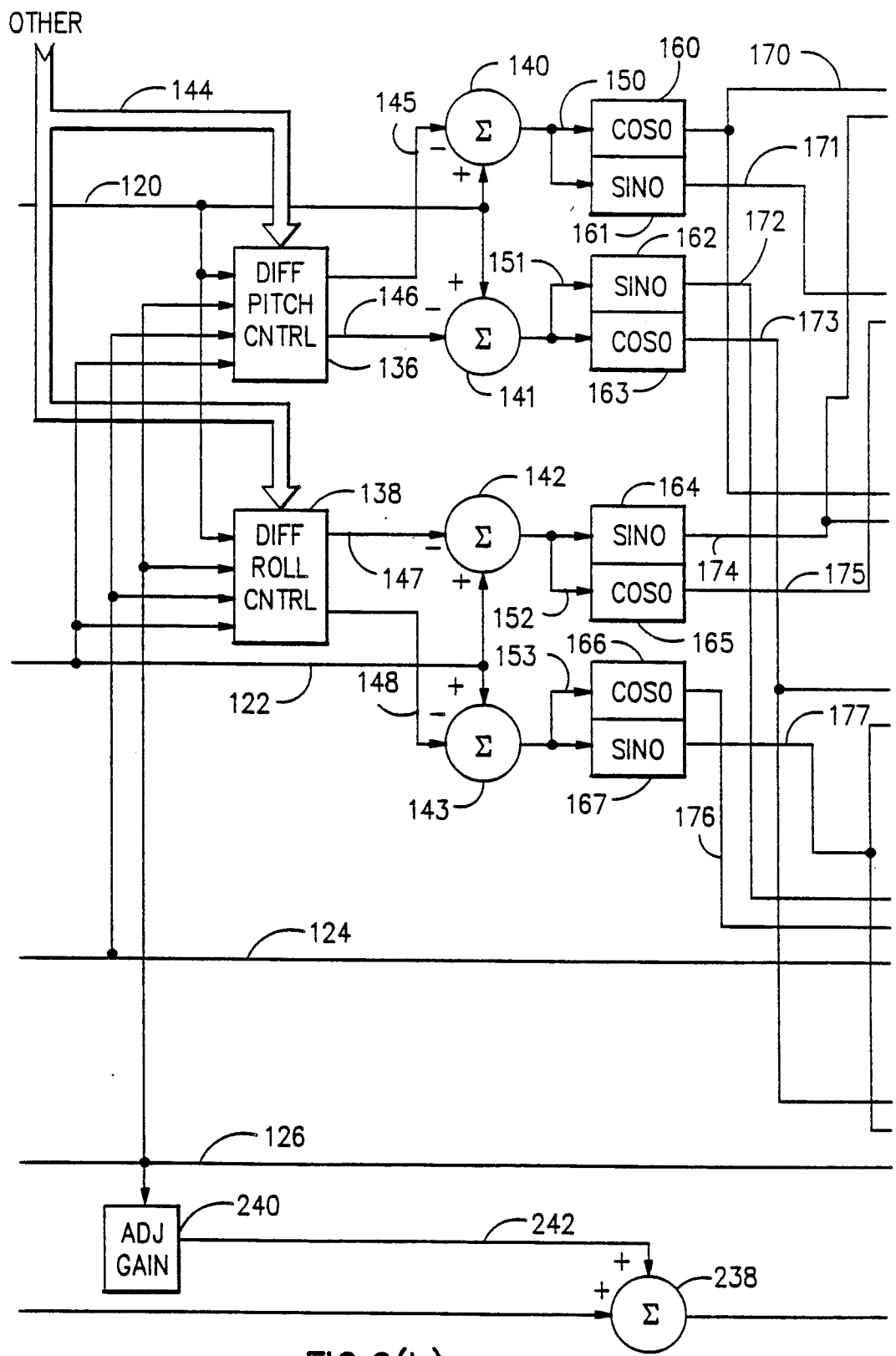
FIG. 2 is a simplified block diagram of the mixer unit of the present invention.
Figure 2C:
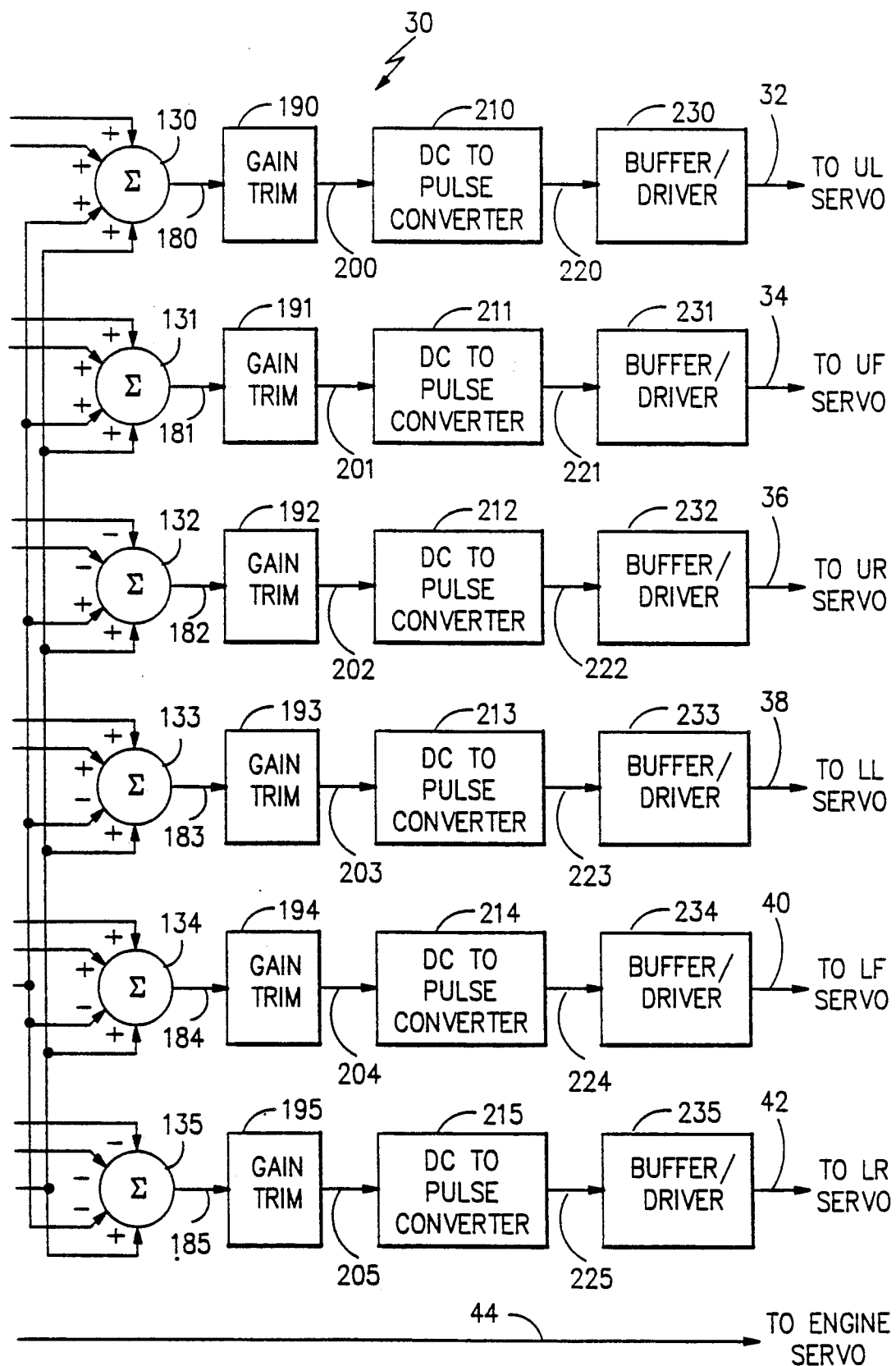

Referring now to FIG. 2, the PWM control signals provided on lines 22, 24, 26, 12, are converted from serial pulse signals to corresponding representative DC signals by pulse to DC converters 70-76. The DC signals are provided on lines 80-86 and utilized by sample and hold circuits 90-96 to periodically sample the DC control signals and hold the sampled signals on lines 100-106. Adjustable gain stages 110-116 provide bias adjustment to the DC signals on lines 100-106 for adjusting control authority sensitivity and provide output pitch, roll, yaw, and collective command signals on lines 120-126.

The YAW and CLTV command signals on lines 124, 126 are provided to summing junctions 130-135 and differential pitch and roll control circuits 136, 138. The pitch and roll command signals on lines 120, 122 are provided to differential pitch and roll control circuits 136, 38 and summing junctions 140-143.

Differential pitch and roll control circuits 136, 138 utilize the command signals on lines 120-126 and other signals which are indicative of various flight parameters and provided on lines 144 by measurement systems (not shown), such as strain gauges or accelerometers, to provide adjustment signals on lines 145-148 utilized by summing junctions 140-143 for changing the pitch and roll command signals on lines 120, 122. Usually, the output of circuits 136, 138 will be zero magnitude and summing junctions 140-143 will not change the signals on lines 120, 122. If differential pitch or roll control (between upper and lower rotors) is desired due to a specific flight condition, circuits 136, 138 will increase or decrease the signals on lines 120, 122 appropriately. For example, differential rotor control can be utilized to mitigate vibration and structural loading problems caused by the outboard migration of rotor lift moment resulting from the increased blade velocities occurring as a result of aircraft forward velocity A forward velocity measuring device could provide a representative velocity signal on line 144 to be utilized by circuits 136, 138 to change the command signals on line 120, 122 to alter blade cyclic pitch and move the rotor lift moment inboard if aircraft forward velocity reaches a predetermined threshold magnitude (stored in circuits 136, 138). The particular function of circuits 136, 138 is dependent on the aircraft and mission flight profile and it is intended that circuits 136, 138 be adaptable to as many situations as possible.

The outputs of summing junctions 140-143 provided on lines 150-153 and the pitch and roll command signals on line 120, 122 are utilized by trigonometric function circuits 160-167 which multiply the input signal times the appropriate trigonometric function of the angle ($\theta$) between each set of control servos 50-54 and 56-60. For instance, if the control servos are placed 90 degrees apart, circuit 160 multiplies the signal on line 150 by the sine of 90 degrees, or one and circuit 161 multiplies the signal by the cosine of 90 degrees, or zero.

Each of the summing junctions 130-135 sums a different combination of the signals on lines 170-176 and 124-126 in order to translate operator commands into appropriate servo commands. For example, summing junction 132 adds the yaw and collective command signals provided on signal lines 124 and 126, respectively, and subtracts the pitch and roll command signals provided on lines 170 and 174, respectively.

The outputs of the summing junctions 130-135 are provided on lines 180-185 to individual servo sensitivity gain adjustments 190-195 which provide signals on lines 200-205 to DC-to-pulse converters 210-215. The DC-to-pulse converters 210-215 change the servo command signals from DC signals back into PWM signals provided on lines 220-225 to buffer/drivers 230-235. The isolated signals provided by the buffer/drivers 230-235 on lines 32-42 are utilized by the six rotor servos 50-60 to control the movement of the rotor blades.

The engine throttle signal on line 14 is provided to a summing junction 238 and summed with a signal provided on a line 242 by an adjustable gain circuit 240 which amplifies the collective command signal provided on line 126. The output of summing junction 238 is the engine servo signal provided on line 44.

The mixer unit 30 may be implemented using analog circuitry, dedicated digital circuitry or as a software program using circuit designs well known in the prior art. The equivalence between analog, dedicated digital and software is illustrated (in a different context) in U.S. Pat. No. 4,294,162.

Figure 3:
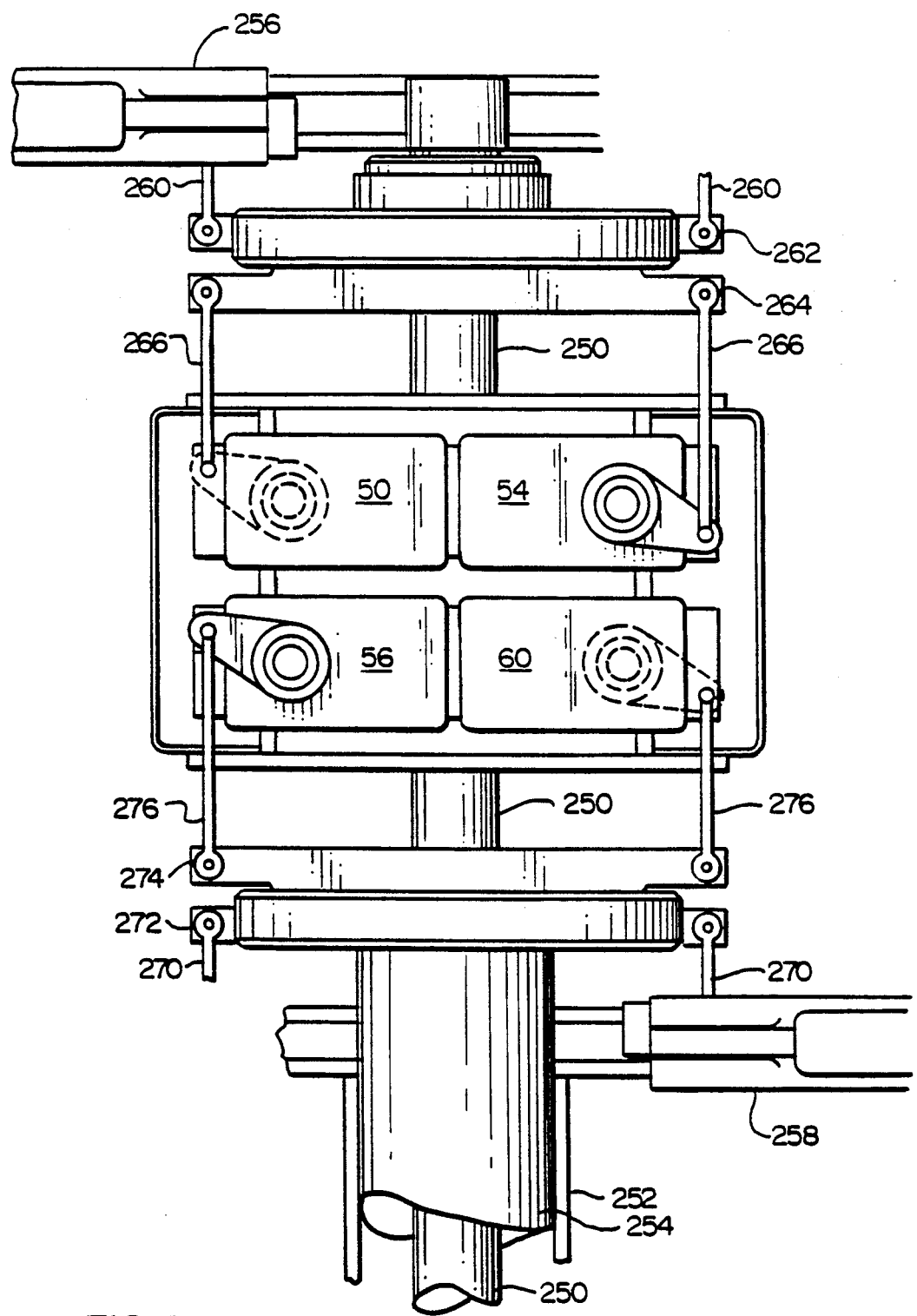
FIG. 3 is a side view of a co-axial rotor system of the present invention wherein the control servos are located between the upper and lower rotors.

Referring now to FIG. 3, an upper rotor drive shaft 250 is separated from a lower rotor drive shaft 252 by a stationary standpipe 254. Upper drive shaft 250 drives rotor 256 and lower rotor drive shaft 252 drives rotor 258. The blade pitch of the upper rotor 256 is controlled by blade pitch rods 260 which are controlled by a rotating swash plate 262 the attitude of which, in turn, is dictated by the attitude of a stationery swash plate 234. The attitude of swash plate 264 is controlled by pitch rods 266 and the three upper rotor servos 50, 52, 54, only two of which 50, 54 are shown. The upper rotor servos are commanded by signals provided on lines 32-36 of FIG. 2.

Similarly, the blade pitch of the lower rotor 258 is controlled by pitch rods 270, rotating swash plate 272, stationary swash plate 274, pitch rods 276, control servos 56, 60 and the other control servo 58 not shown.

Figure 4:
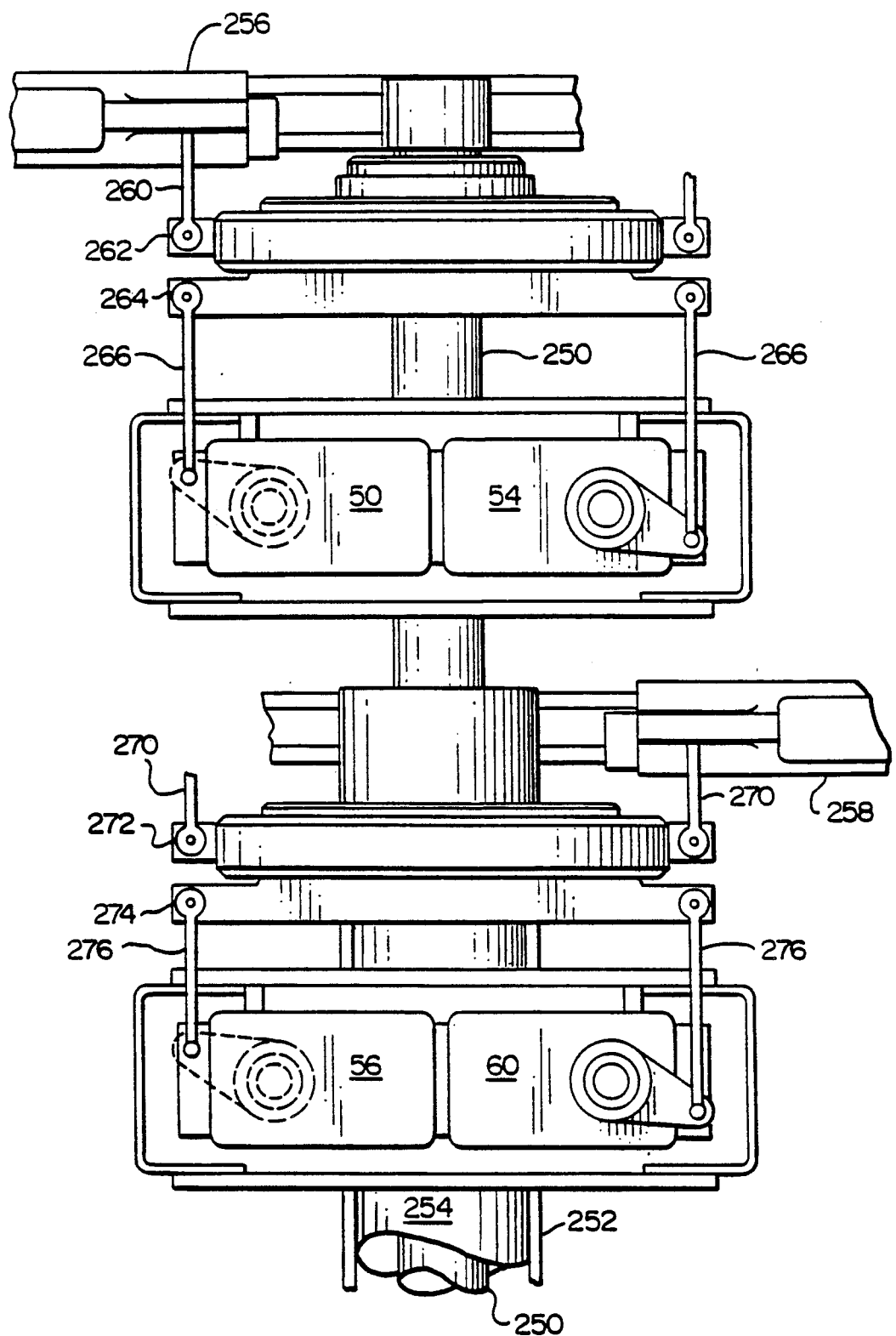
FIG. 4 is a side view of a co-axial rotor system of the present invention wherein each control servo is located below the rotor it is controlling.

Referring now to FIG. 4, a co-axial rotor system is substantially similar to the system illustrated in FIG. 3 except that it has rotor 228 located between the upper servos 50-54 and the lower servos 56-60.

Figure 5:
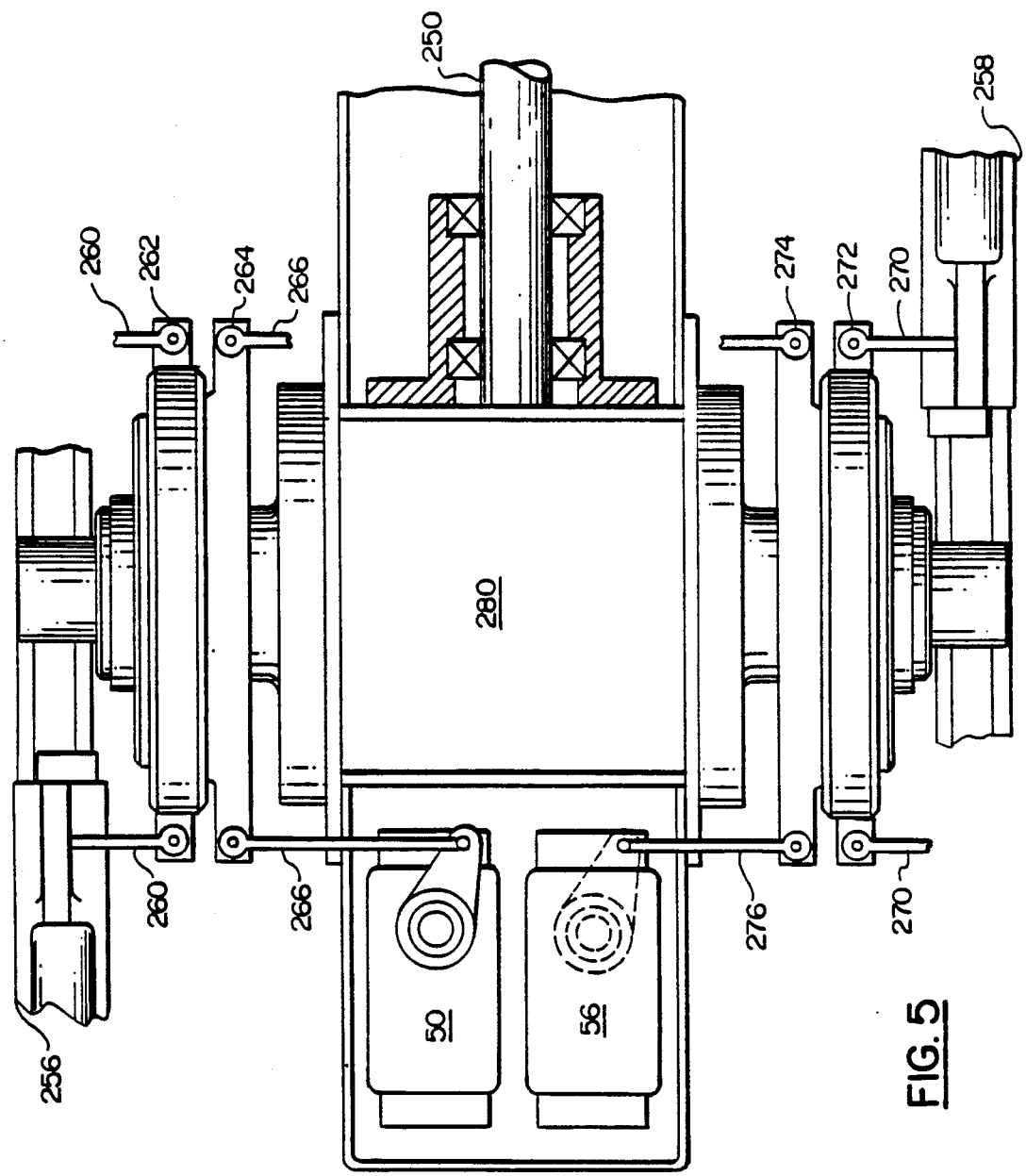
FIG. 5 is a side view of a co-axial rotor system of the present invention wherein the drive shaft runs parallel to the plane of the blades.

Referring now to FIG. 5, a single drive shaft 250 is connected to a gear box 280 to provide power to counter-rotating rotors 256, 258 which are controlled by servos 50, 56 and the other four servos 52, 54, 58, 60 mentioned earlier which are not shown.

FIGS. 3-5 exemplify that the control system of the present invention facilitates placement of the rotor control servos in close proximity to the rotors themselves, thereby eliminating long controlling rods and associated linkages. As a matter of fact, the only clearance necessary between the servos and the swash plates is the distance needed to allow the required attitude changes of the swash plates.

Although the invention has been shown and described with exemplary embodiments thereof, it should be understood by those skilled in the art that the foregoing and various other changes, omissions and additions may be made therein and thereto without departing from the spirit and the scope of the invention.

We claim:

1. A servo control system for a co-axial rotary winged aircraft having an upper and lower rotor comprising:

command means for providing electronic command signals indicative of operator control commands in the pitch, yaw, roll, and collective axes of the aircraft;

electronic mixing means for providing at least three upper, and three lower, rotor electrical servo control signals in response to said command signals;

a plurality of upper swash plate servo means for controlling the pitch of the upper rotor blades of the aircraft in response to said upper rotor electrical servo control signals; and a plurality of lower swash plate servo means for controlling the pitch of the lower rotor blades of the aircraft in response to said lower rotor electrical servo control signals.

2. The servo control system for a co-axial rotary winged aircraft according to claim 1, wherein said servo means are mounted a distance from the rotors on the same order of magnitude as the distance required to permit necessary attitude orientation of the swash plates.

3. The servo control system for a co-axial rotary winged aircraft according to claim 1, wherein said command means comprises:

transmitter means for providing transmitted electronic signals indicative of operator control commands; and receiver means for receiving said transmitted electronic signals and providing received electronic signals indicative of said transmitted signals.

4. The servo control system for a co-axial rotary winged aircraft according to claim 1, wherein said command means comprises a flight control computer.

5. The servo control system for a co-axial rotary winged aircraft according to claim 1, further comprising:

flight parameter means for providing electronic flight parameter signals indicative of the dynamic flight parameters of the aircraft;

differential rotor control means responsive to said flight parameter signals for providing electronic differential rotor control signals; and wherein said electronic mixing means is further responsive to said differential rotor control signals.

* * * * *